(12) United States Patent
Bright et al.

(10) Patent No.: US 7,206,574 B2
(45) Date of Patent: Apr. 17, 2007

(54) AUTOMATED EXCHANGE OF BROADBAND COMMUNICATION ADDRESSES OVER A NON-BROADBAND CHANNEL IN A WIRELESS TELECOMMUNICATION SYSTEM

(75) Inventors: Penny Lynne Bright, Naperville, IL (US); Karla Rae Hunter, Naperville, IL (US); Harold Aaron Lassers, Elmhurst, IL (US); Anne Yin-Fee Lee, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 594 days.

(21) Appl. No.: 10/417,517

(22) Filed: Apr. 17, 2003

(65) Prior Publication Data
US 2004/0209614 A1    Oct. 21, 2004

(51) Int. Cl.
*H04Q 7/20* (2006.01)
(52) U.S. Cl. .................................. 455/426.1; 455/466
(58) Field of Classification Search ............. 455/414.1, 455/426.1, 426.2, 461, 466; 370/254, 255, 370/386, 400; 709/245, 249
See application file for complete search history.

(56) References Cited

U.S. PATENT DOCUMENTS

| | | | |
|---|---|---|---|
| 6,990,352 B2* | 1/2006 | Pyhalammi et al. | 455/466 |
| 6,999,573 B2* | 2/2006 | Weaver | 379/211.02 |
| 2004/0157590 A1* | 8/2004 | Lazaridis et al. | 455/415 |
| 2006/0031126 A1* | 2/2006 | Ma et al. | 705/26 |

* cited by examiner

*Primary Examiner*—Benny Quoc Tieu (57) ABSTRACT

A broadband address of a first subscriber is identified and communicated to a second subscriber in a first communication system using an SMS data enabled cellular system or call origination set up messaging. If authorization is given by the second subscriber, the broadband address of the second subscriber is delivered to the first subscriber by the first communication system, whereby the first and second subscribers have exchanged their respective broadband addresses over a first communications system where the broadband addresses are utilized for broadband communications over a second communication system.

13 Claims, 6 Drawing Sheets

AUTOMATED EXCHANGE OF BROADBAND COMMUNICATION ADDRESSES OVER A NON-BROADBAND CHANNEL IN A WIRELESS TELECOMMUNICATION SYSTEM

BACKGROUND

This invention relates to telecommunication systems that support broadband communications and more specifically relates to providing broadband communication addresses via an independent non-broadband channel in a wireless telecommunication system that does not support multimedia services.

Wireless telecommunication services continue to evolve. Earlier direct point to point two-way communication systems are being supplemented by, and in some situations replaced by, cellular communication systems. Multimedia enabled wireless communication systems such as the IMS IP-Multimedia System permit subscribers using multimedia enabled wireless devices to engage in voice communications, establish data communications over a broadband communication link, and utilize a broadband communication link while simultaneously engaging in a voice call.

Many telecommunication systems in current operation do not support such multimedia services. Some cellular systems support only voice channel communications. Other cellular systems such as GSM, TDMA (IS-136) and CDMA (IS-95) support limited bandwidth data communications such as short messaging system (SMS) messages in addition to supporting conventional voice calls; CDMA also supports narrowband data communication. Still other wireless communication systems such as CDPD Cellular Digital Packet Data (IS-732) and HRPD High Rate Packet Data also known as 1xEV-DO Data Only (IS-856) provide data only networks. Other wireless communication systems such as IEEE 802.11 systems, provide only broadband communication links for personal digital assistants (PDA) and portable personal computers equipped with an appropriate wireless modem.

Subscribers of existing wireless communication systems that do not directly support multimedia services may encounter circumstances where simultaneous voice and broadband data services are desirable. For example, a subscriber with a cellular telephone enabled for SMS messaging may also utilize a laptop computer with a wireless modem supported by a separate broadband communication service provider having a network infrastructure that is independent from the network utilized for cellular services. Such a first subscriber may desire to establish a voice call and simultaneously engage in broadband data communications with a second subscriber of the same or compatible services. Assuming Internet protocol (IP) addresses identify the first and second subscribers' broadband devices, each of these devices must utilize the IP address of the other device for communications. Although the first subscriber could utilize his cellular telephone to call the cellular telephone of the second subscriber and exchange IP addresses by the subscribers verbalizing their respective IP addresses to each other, this burden is awkward and not desirable. For example, the subscriber hearing the spoken IP address of the other may be in a mobile environment so that writing down (or typing on keyboard or keypad) is unsafe or not possible. IP addresses are easily misunderstood based on verbal communications because of the nature of the alphanumeric characters used in the addresses. Typically, the IP addresses are known by the computer and not by the users (non-technical people might have difficulties figuring out how to get IP address information). Therefore, it would be desirable to minimize such difficulties in exchanging IP addresses.

SUMMARY OF THE INVENTION

It is an object of the present invention to provide an improved method that minimizes such difficulties in exchanging IP addresses.

In accordance with embodiments of the present invention, a first communication system is used to exchange users' addresses, such as IP addresses or URL site, utilized for broadband communications in a second communication system that is separate from the first communication system.

In a first embodiment, an originating subscriber in the first communication system such as an SMS data enabled cellular system initiates a call including a broadband flag to a second subscriber. The originating subscriber's MSC identifies the call request for special handling by the presence of the broadband flag. The MSC generates and transmits an SMS message to the second subscriber where the SMS message includes the broadband address of the originating subscriber. The second subscriber's cellular telephone receives the SMS message, extracts the first subscriber's broadband address, and upon authorization by the second subscriber, the broadband address of the second subscriber is transmitted to the first subscriber in a reply SMS message. Similarly, the first subscriber's cellular telephone extracts the broadband address of the second subscriber upon receipt of the reply SMS message. Preferably, the first communication system CPE devices (cellular telephones) of the first and second subscribers are each coupled to the corresponding broadband communication devices operating on the second communication system so that the broadband addresses received by the cellular telephones are automatically transferred to the broadband devices. If desired, the first and second subscribers can also establish a normal voice call over the first communication system using their respective cellular telephones while simultaneously engaging in broadband communications over the second communication system.

In another embodiment, the broadband addresses of the first and second subscribers are exchanged as part of the process for setting up a voice call in the first communication system.

The originating subscriber's MSC adds the originating subscriber's broadband address to the set up IAM message as a calling party subaddress or a user-to-user information element. The called subscriber's MSC receives the call request containing the added broadband address and communicates the broadband address to the called subscriber's first communication system device by either passing the information as received or generating an SMS message or utilizing in-band signaling. Upon authorization by the called subscriber, his broadband address is communicated to the originating subscriber by the called subscriber's MSC generating an SMS message or by the MSC adding the broadband address to a subaddress field of the connect signal, or by adding a user-to-user information element to the connect message/ANM.

DETAILED DESCRIPTION OF EMBODIMENTS

In general, the exemplary embodiments of the present invention are intended to present the subscriber (user) with an ability, similar to capabilities offered by multimedia systems, to easily start up a broadband communications session. As used herein, a "multimedia" system refers to a single telecommunication system that can simultaneously support voice conversation, e.g. a telephone call, and broadband data communications so that a subscriber can hold a conversation while simultaneously communicating data at high data rates. Because a single multimedia system permits simultaneous voice and broadband data transmission, it is relatively easy for a multimedia subscriber to start a broadband communications session with another multimedia subscriber based on an existing voice connection. However, starting a broadband communication session hosted by one system based on voiced information from a connection hosted by a separate, independent system has presented difficulties as discussed above.

First Embodiment

Figure 1:
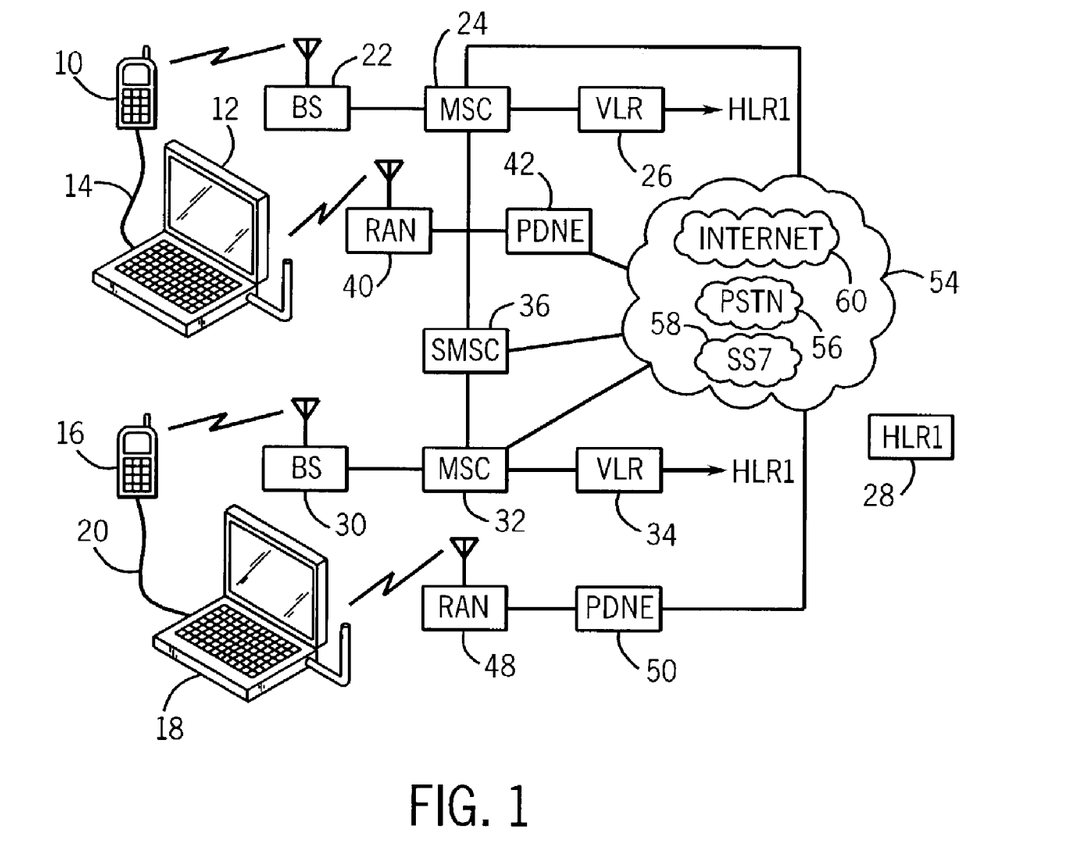
FIG. 1 is a block diagram of a telecommunications system suited for incorporating embodiments of the present invention.

Referring to FIG. 1, the exemplary telecommunication network includes a first system that supports wireless cellular subscribers with voice communications and SMS messaging, and a second system that is independent of the first system and provides wireless broadband data services. A first subscriber utilizes a wireless device 10 such as a cellular telephone with SMS data capabilities and a wireless device 12 such as a laptop personal computer with a wireless modem for communications. A cable (or wireless equivalent, e.g. Bluetooth/infra-red) 14 connects a port on the cellular telephone with a port on the laptop computer to facilitate the transfer of data between these devices. A second subscriber is equipped with communication capabilities similar to the first subscriber including a SMS data enabled cellular telephone 16, laptop computer 18 with wireless modem, and a cable/wireless (e.g. Bluetooth/infra-red) 20 that interconnects these two devices. Wireless communications with devices 10 and 16 are supported by the first system. Wireless communications with laptop computers 12 and 18 are supported by the second system.

The first system includes base stations (BS) 22 and 30, mobile switching centers (MSC) 24 and 32, visiting location registers (VLR) 26 and 34, home location register (HLR1) 28, and short messaging service center (SMSC) 36. The second system includes radio access network (RAN) 40 and 48, packet data network equipment (PDNE) 42 and 50 which can consist of:

for CDPD: MD-IS (Mobile Data Intermediate System)
for HRPD: PCF (Packet Control Function) & PDSN (Packet Data Service Node)/Foreign Agent & Home Agent & AAA server
for GPRS: SGSN (Serving GPRS Support Node)/VLR (visiting location register) & GGSN (Gateway GPRS Support Node) & HLR (home location register)
for CDMA IS-95:IWF (Interworking Function) & AAA server.

The first and second systems are connected to other communication systems by the general communication network 54 including the public switched telephone network (PSTN) 56, signaling system (SS) seven 58, and the Internet or Packet Network 60. The connections of the mobile switching centers and the SMS center to network 54 illustrate communication paths for user voice and data communications. Other connections between the illustrated elements and connections between the elements and the SS7, PSTN, and Internet networks have been omitted in order to simplify the representation of the first and second systems in FIG. 1.

The elements of FIG. 1 perform their normal functions except as explained below for the embodiments of the present invention. The base stations provide radio frequency channels linking the wireless devices and the respective mobile switching centers. The mobile switching centers function as switches that assist in originating communications initiated by wireless subscribers and terminate communications bound for a served wireless subscriber. The visiting location registers maintain and store a list of active wireless devices and the respective base stations serving each. The home location registers store basic information concerning each subscriber of a system and are normally queried to ascertain the validity of a subscriber upon the subscriber entering the service area or turning on the wireless device.

The SMS center receives SMS messages associated with served wireless subscribers and functions as a router that forwards SMS messages towards the destination of the message. The PSTN provides switched communication links to facilitate communications among switches and nodes coupled thereto. The SS7 network carries signaling and control signals that facilitate the setting up and tearing down of communication links through the PSTN as well as serving other overhead, administrative and maintenance functions. The Internet serves as a distributed network that facilitates IP communications among Internet subscribers and databases.

Figure 2:
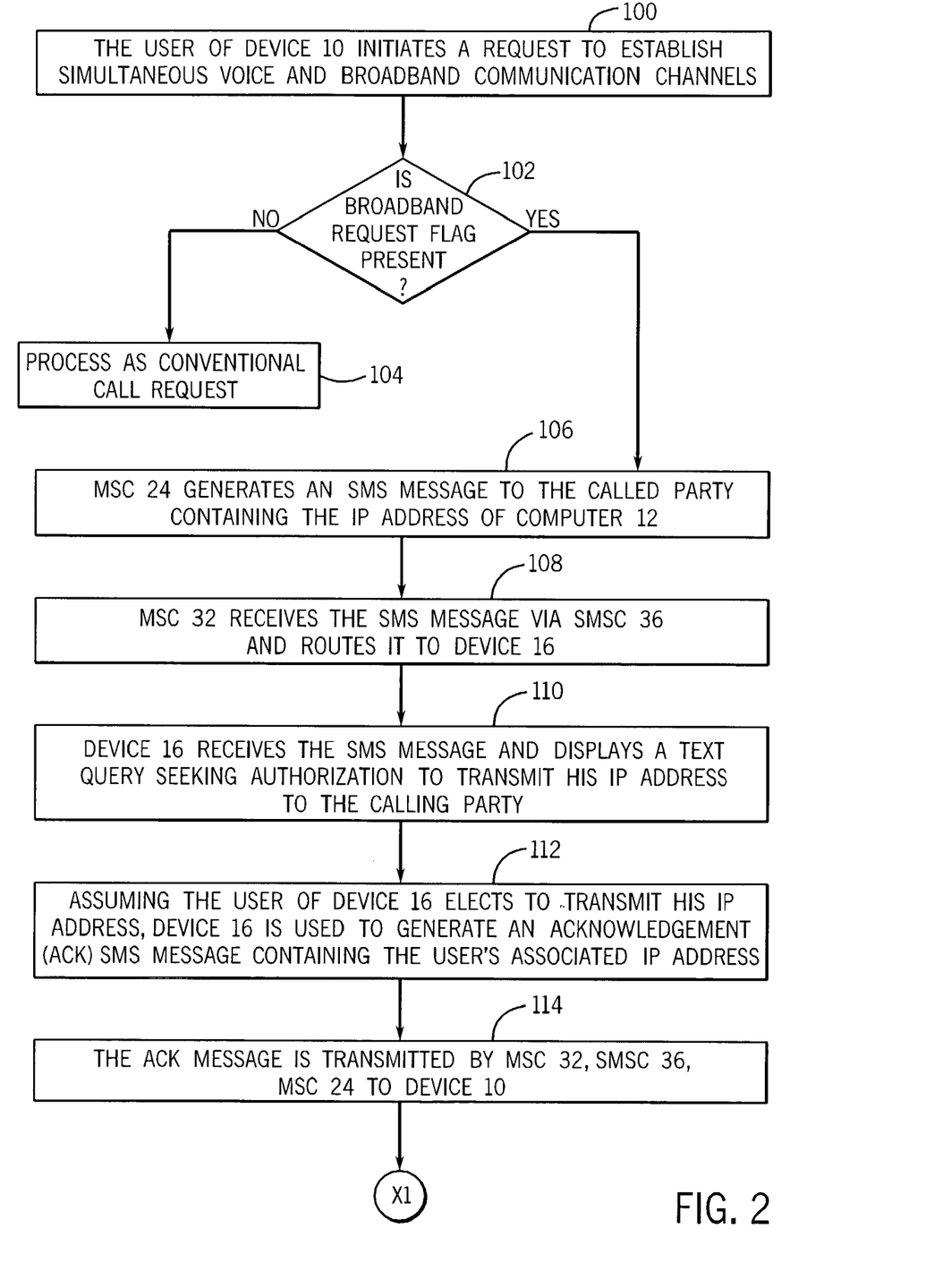
FIGS. 2 and 3 illustrate an exemplary flow diagram of a method in accordance with an embodiment of the present invention.
Figure 3:
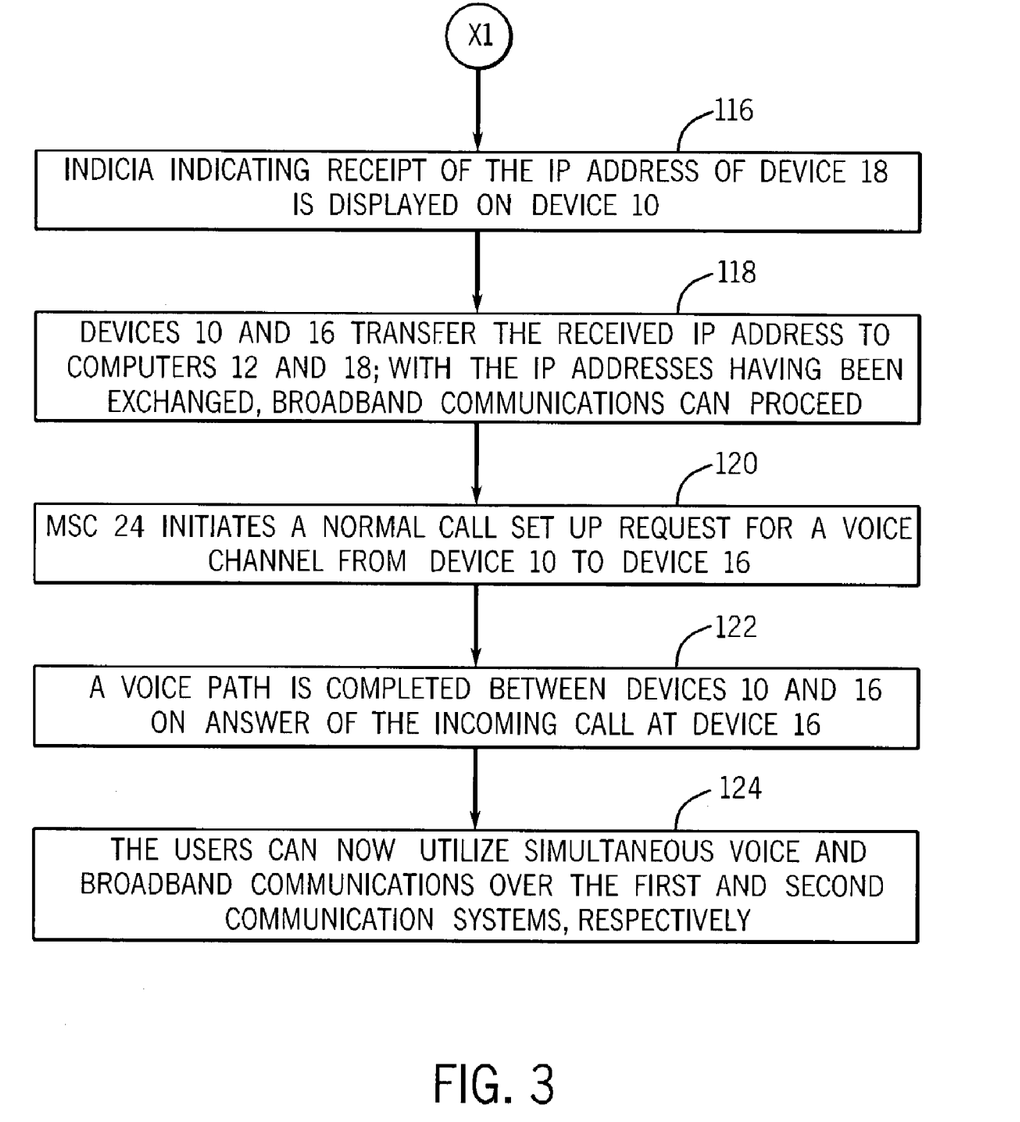

Referring to FIGS. 2 and 3, a flow diagram illustrates a first embodiment of a method in accordance with the present invention. The illustrated method will be better understood by also referring to the infrastructure shown in FIG. 1. The first (originating) user of wireless devices 10 and 12 desires to establish a broadband connection between personal computer 12 and personal computer 18 of a second user (called party). The first user also desires to establish a simultaneous voice call with the second user via cellular telephones 10 and 16. The first user knows the cellular telephone number of the second user, but does not know the broadband address of the second user, i.e. the IP address of the second user's personal computer 18 or URL site associated with the second user.

In step 100 the first user initiates a request for communications services using cellular telephone 10 to establish simultaneous voice and broadband communication channels. In addition to containing the cellular telephone number of the called party, the request includes the transmission of a broadband request flag indicating a desire to exchange IP addresses with the called party. The request flag may consist of the user entering a predetermined digit sequence, such as "# 23 #", prior to entering the telephone number of cellular telephone 16. Alternatively, a control button on cellular telephone 10 can be assigned this function and cause the predetermined digit sequence to be automatically transmitted. The request also includes the IP address assigned to computer 12 and the telephone number of cellular telephone 16. The IP address assigned to computer 12 is available to cellular telephone 10 since it is in communication with computer 12 by cable/wireless (e.g. Bluetooth/infra-red) 14.

Alternatively, the user may have manually entered and stored the IP address of computer 12 into cellular telephone 10 prior to the initiation of the requested communications. This request is received by base station 22 and passed to MSC 24 for further processing. In accordance with normal telecommunication protocol the calling party's number, i.e. the number of cellular telephone 10, is known to the originating MSC.

In step 102, MSC 24 makes a determination of whether a broadband request flag is present in the communication request received from cellular telephone 10. A NO determination results in the MSC 24 processing the communication request as a conventional call request in step 104. A YES determination by step 102 results in the MSC 24 generating an SMS message to the called party at step 106. The MSC 24 utilizes the calling and called telephone numbers to generate an SMS message to cellular telephone 16. This SMS message contains the IP address of computer 12 and a predetermined text message stored MSC 24. The purpose of the predetermined text message to be displayed to the called party is to seek authorization (an election) of whether the IP address associated with the called party's computer should be transmitted to the calling party.

In step 108, MSC 32 receives the SMS message via SMSC 36 and routes the message to destination device, cellular telephone, 16. Device 16 receives the SMS message in step 110 and displays the text query that seeks authorization to transmit an acknowledgement/reply SMS message to the calling party containing the IP address associated with computer 18. In step 112, device 16 generates the acknowledgment SMS message containing the user's associated IP address, assuming that the user of device 16 elects to have his IP address transmitted to the calling party. Preferably, device 16 is programmed to automatically identify and respond to the received text query. An exemplary predetermined text query could read "Press 1 to authorize, or 2 to deny, transmission of your IP address to [CLID] by a reply to this SMS message" where [CLID] represents identification of the calling party by telephone number, name if available, or IP address dependent upon the design choice by the service provider. Upon the user of device 16 pressing "1", this device automatically acquires the IP address of computer 18 by cable/wireless (e.g. Bluetooth/infra-red) 20, if the IP address was not previously stored in device 16 and generates an SMS message to the calling party containing the IP address. Upon the user of device 16 pressing "2", the device will automatically generate an SMS message to the calling party containing a predetermined text reply advising the calling party that the user of device 16 has declined to provide an IP address. Alternatively, the user of device 16 could manually compose and transmit a responding SMS message that could, depending upon the election by the user, containing his IP address.

In step 114 the acknowledgment message is received by MSC 32 and transmitted by SMSC 36 and MSC 24 to device 10. Indicia, such as a text message included with the received SMS acknowledgment message, is displayed on device 10 in step 116. The indicia indicates receipt of the IP address of device 18, assuming the election was made to transmit the IP address of computer 18. Preferably, device 10 is programmed to automatically respond to the received acknowledgment SMS message identifying the IP address contained in the message and transmitting it by cable/wireless (e.g. Bluetooth/infra-red) 14 to computer 12. Alternatively the user of device 10 could manually enter the received IP address displayed on the screen of device 10 into computer 12. As indicated at step 118, devices 10 and 16 have transferred the received IP addresses to computers 12 and 18 thereby enabling broadband communications to proceed.

In step 120, MSC 24 initiates a normal call set up request for a voice channel from device 10 to device 16. Preferably, MSC 24 automatically initiates this call request without requiring a further call initiation request from device 10. For example, MSC 24 can defer requesting a voice channel call when the original request is received that included the broadband request flag. The MSC 24 can proceed with the voice channel request after a short predetermined time interval following the delivery of the acknowledgment SMS message to device 10. Alternatively, the user of device 10, after receiving the acknowledgment SMS message, can initiate a new normal voice call to the user of device 16. Alternatively, MSC-24 does not wait for receiving the response SMS message, since this response SMS message can be delivered and processed during the call. Assuming that the user associated with device 16 answers the incoming voice call, a voice path is completed between devices 10 and 16 at step 122. As indicated in step 124, the users can now utilize simultaneous voice and broadband communications over the first and second communications systems, respectively. The first and second users have a voice communication path established between cellular telephones 10 and 16. Additionally, the computer 12 of the first user has been provided with the IP address of computer 18, and likewise computer 18 has been provided with the IP address of computer 12. A broadband data connection between computers 12 and 18 is provided through radio access network 40 and 48, packet data network equipment 42 and 50, and through Internet or packet network 60 and/or PSTN 56. Thus, the first and second users have utilized the first communication system to facilitate simultaneous voice and broadband data communications.

Second Embodiment

The second embodiment is substantially the same as the first embodiment except as in the storage and determination of the IP address as described below. In the first embodiment the IP addresses of the first and second subscriber are exchanged with each other by the cellular telephones transmitting the respective IP addresses. The IP address of the first subscriber is transmitted by cellular telephone 10 to MSC 24 as part of the initial request for communication services. In the second embodiment, the IP address of computer 12 is stored in the first system, e.g. in the home location register 28 that supports communication with cellular telephone 10. The IP address can be manually entered into the home location register directly by the subscriber or by the subscriber providing the information to an administrator of the first system service provider. Alternatively, computer 12 and/or computer 18 could provide its IP address to a database such as the HLR via an internet access (assuming both the database and the computer have IP access); this is particularly desirable when dynamic IP addresses are assigned. Each time cellular telephone 10 is powered up or initially enters the service area of the first system, the system will seek to verify that the subscriber requesting service is a valid registered subscriber. An inquiry identifying the subscriber requesting service will be transmitted from the visiting location register associated with the MSC servicing the service request to the home location register that maintains a database of valid subscribers. In accordance with the second embodiment, the home location register also includes an IP address in the record associated with each subscriber. Upon validating the subscriber, the home location register includes the IP address associated with subscriber in the validation message sent to the visiting location register. This information is stored in the visiting location register. Upon the MSC receiving a service request having a broadband request flag, the MSC requests from the visiting location register the IP address associated with the subscriber making the current communication request. Thus, in accordance with the second embodiment the IP address associated with a cellular subscriber does not have to be transmitted by the cellular telephone. This permits cellular telephones that do not have a capability of communicating by a cable/wireless (e.g. Bluetooth/infra-red) with a computer to be utilized.

Similarly, the called party cellular telephone 16 does not have to store or transmit the IP address associated with computer 18. The IP address of computer 18 will have been previously transmitted to the cellular subscriber's home location register and will be stored in the visiting location register that supports the second subscriber. Upon MSC 32 receiving the acknowledgement SMS message from device 16 with an election to provide the IP address, MSC 32 will query the visiting location register associated with device 16 and receive a reply with the corresponding IP address associated with the second subscriber. The MSC 32 incorporates the IP address into the acknowledgement SMS message that is transmitted to MSC 24.

In accordance with the second embodiment, neither the originating cellular telephone nor the cellular telephone of the called party are required to store or transmit the respective IP addresses in order to effectuate an exchange of IP addresses between the first and second subscribers. If a data link does not exist between the cellular telephone and associated computer of a subscriber, then the IP address of the other subscriber's computer can be manually input by the subscriber. Although this places a demand on the subscriber, errors associated with the acquisition of the IP address of the other subscriber are eliminated and any input errors made by the subscriber can be easily discerned since the IP address of the other subscriber will be displayed for easy reference on the screen of the subscriber's cellular telephone.

Third Embodiment

In the third embodiment the first subscriber, desiring to establish a broadband communication link with the second subscriber, initiates the process by using cellular telephone 10 to initiate an SMS message to the second subscriber. Similar to the first and second embodiments, the IP address of the first subscriber and a predetermined text message is transmitted as part of the SMS message transmitted by MSC 32 to cellular telephone 16 of the second subscriber. The IP address of the first subscriber and the predetermined text message can be appended to the SMS message initiated by the user of device 10 by MSC 24, or alternatively by SMSC 36. In order to identify the initial SMS communication from device 10 as a special request seeking the IP address associated with the called party (second subscriber), a broadband request flag can be embedded in the initial SMS message, e.g. in the header of the message. The IP address of the first subscriber can be obtained by either method explained in the first and second embodiments. The third embodiment can proceed substantially as explained in the first embodiment or alternatively as explained in the second embodiment, upon MSC 32 transmitting the SMS message to device 16.

The first, second and third embodiments provide methods for automatically exchanging IP addresses using communications on a first system to enable broadband communications utilizing the IP addresses on a second system. The communications employed on the first system do not require the use of the IP addresses for routing information.

Embodiment Variations

Various modifications and substitutions can be made to the methods described in the embodiments. The following variations are offered merely to illustrate some additional implementations, not as a listing of all possible implementations and variations that can be practiced in accordance with the present invention. In the above embodiments, a cellular telephone and a portable personal computer were supported by separate first and second communication systems. Alternatively, a single wireless device could support both voice and broadband data communications. Such a wireless device could comprise a wireless telephone that includes an integrated computing facility where the wireless telephone supports voice telephone calls on a first wireless system and the computing facility supports broadband data communications on a second, separate wireless system. Alternatively, the wireless device could comprise a personal computing facility, such as a laptop computer or a PDA, with a wireless modem having an integrated telephone capability where the integrated telephone supports voice calls on a first wireless system and the computing facility supports broadband data communications on a second, separate wireless system.

The predetermined text message, which requests the second subscriber to authorize the transmission of his IP address to the first subscriber, is described in the first embodiment as being generated by the MSC that supports the first subscriber. However, the predetermined text message could be generated elsewhere in the first system such as at the MSC that supports the second subscriber. Alternatively, the cellular telephones could store the predetermined text message that could be activated for display on the local cellular telephone upon receipt of an incoming SMS call request seeking an exchange of IP addresses.

The messages in the first communication system associated with an exchange of IP addresses are identified by flags. The flags may comprise the use of a predetermined byte sequence at predefined locations in the messages. Alternatively, the flags may comprise the presence of information in a field of the message, e.g. the field containing the IP address.

The IP addresses of the subscribers can be provided by the associated wireless telephones of the subscribers or can be stored in a database that can be accessed by a query from the first system. Although the embodiments have been described with regard to the exchange of IP addresses, other types of communications-related identification information may be desired in different implementations. For example, a first subscriber may desire to communicate with a second subscriber via the second subscriber's web site, or communicate with such a web site, whereby a universal resource locator (URL) associated with the second subscriber could be provided to the first subscriber instead of an IP address. For example, users of a net meeting, may also provide a net meeting identifier.

In the illustrative architecture shown in FIG. 1, both computers 12 and 18 support wireless broadband data communications for the respective subscribers. It will be apparent to those skilled in the art that one or both of the end-user devices supporting broadband data communications could be connected by an optical or wire line to a broadband data network.

Additionally, computer 12 and/or computer 18 may be able to directly generate the SMS message that contains its IP address (instead of the need for communicating this information through the mobile 10 and/or mobile 16, respectively).

Fourth Embodiment

Figure 4:
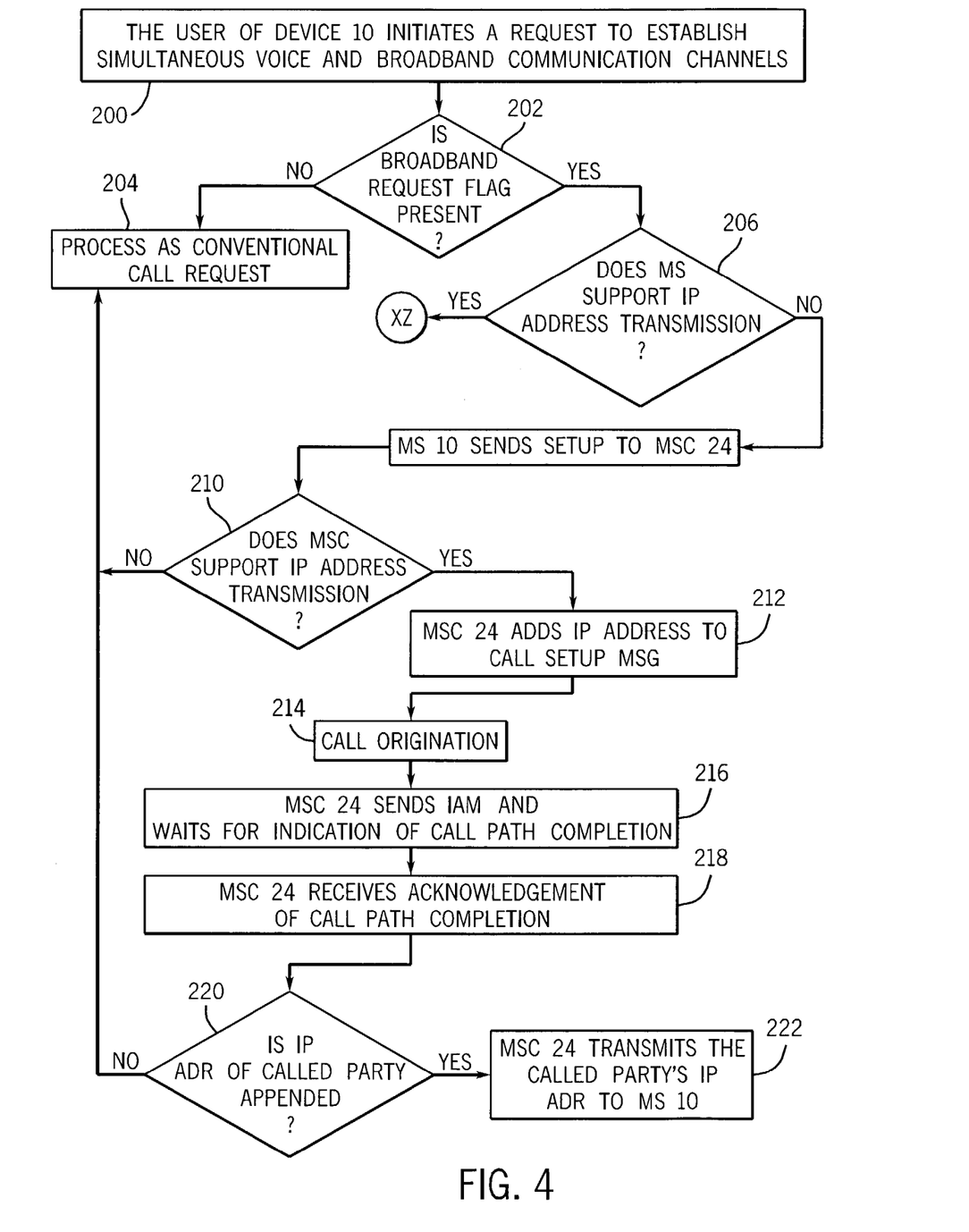
FIGS. 4 and 5 illustrate an exemplary flow diagram of another embodiment from the call origination perspective.
Figure 5:
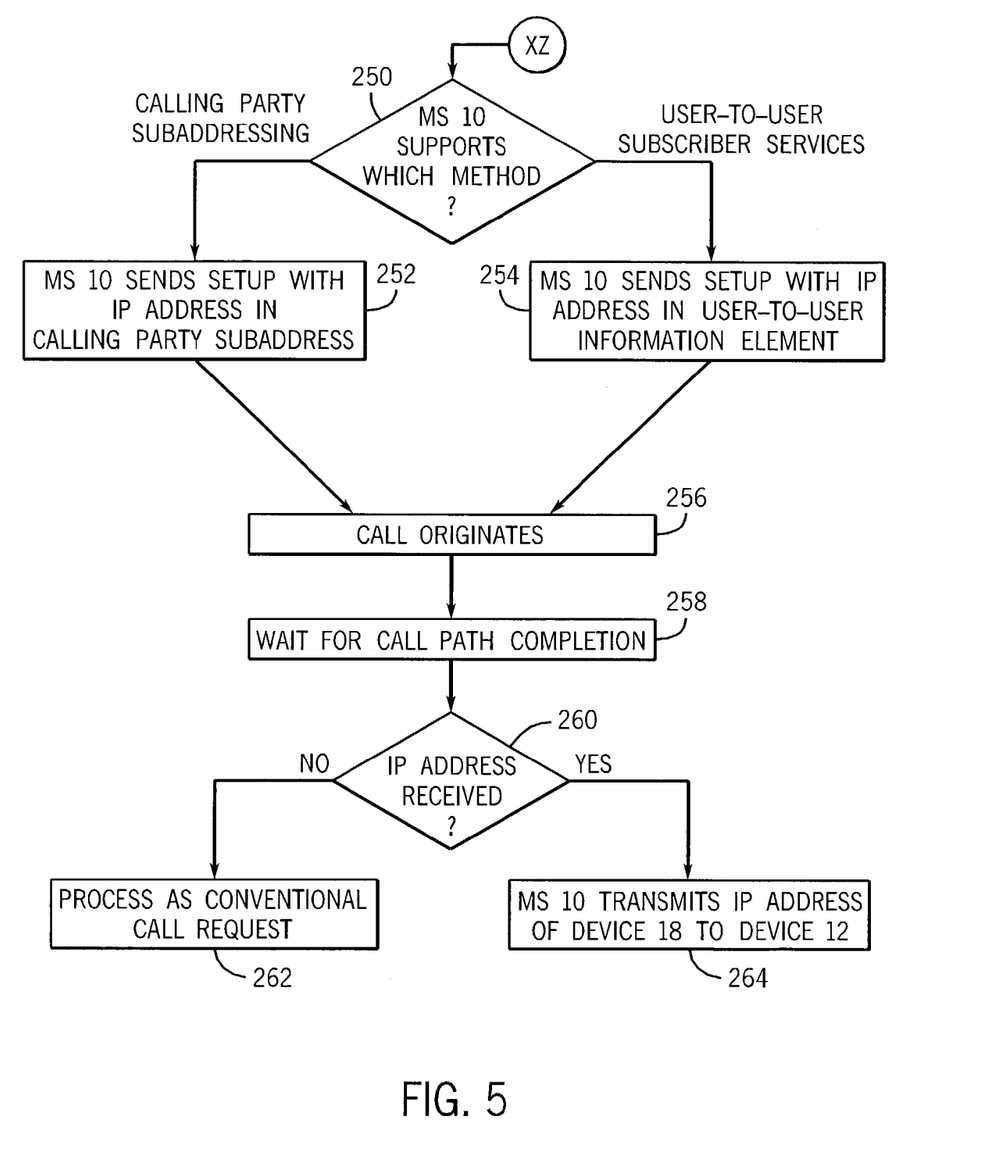

Referring to FIGS. 4 and 5, a flow diagram is shown from a call origination perspective for a fourth embodiment in which messages associated with setting up a telephone call in a first communication system are utilized in exchanging IP addresses between users to facilitate broadband communications over a second communication system. The movable communication devices are also referred to as mobile stations (MS). In step 200 the user of device 10 initiates a request to establish simultaneous voice and broadband communication channels. In step 202 a determination is made at MS 10 of whether a broadband request flag is present in the request for communications initiated by the user. As explained for the first embodiment, the broadband request flag may consist of a predetermined digit sequence either entered manually by the user or automatically upon the user pressing a special function button of device 10. If MS 10 determines that the request flag is not present, the communication request is processed as a conventional call request as indicated at step 204. If MS 10 determines that the broadband request flag is present, a determination is made in step 206 of whether the MS supports the transmission of the originating user's associated IP address. A YES determination by step 206 will be explained below with reference to FIG. 5.

A NO determination by step 206 results in the MS 10 sending a call origination set up message to MSC 24 at step 208. The set up message includes the broadband request flag to alert MSC 24 that the requested call set up, in addition to setting up a voice communication channel, seeks to transmit the IP address of the originating user in to the called party in preparation for broadband communications. In step 210 a determination is made of whether the origination MSC supports the transmission of the originating user's IP address after obtaining it from a storage location, i.e. the originating user's VLR, in the first communication system. A NO determination results and the request being processed as a conventional call request at step 204. A YES determination by step 210 results in the processing of the call set up request that depends on the capabilities of the first communication system and the originating MSC. In step 212 the originating MSC 24 adds the originating user's IP address to the call set up message. The IP address can be added to the call set up message as part of the calling party subaddress or as part of a user-to-user information element.

Following the processing by step 212, a call origination proceeds as indicated at step 214. The originating MSC 24 generates an initial address message (IAM) at step 216 and transmits the IAM to the SS 7 network 58 that will identify MSC 32 as supporting the called party (MS 16). The network proceeds with normal processing to establish a call path completion. The originating MSC 24 waits for an indication of call path completion.

In step 218 the MSC 24 receives an acknowledgment of call path completion. This may consist of receiving a CONNECT message such as in the case of normal call processing. Alternatively, MSC 24 by receive an answer message (ANM) that is converted to a connect message. In step 220 a determination is made of whether the IP address of the called party is appended to the call path acknowledgment message received by MSC 24. A NO determination results in the continuation of processing as a conventional call request at step 204. A YES determination results in the MSC 24 transmitting the called party's IP address to MS 10.

Referring to FIG. 5, a YES determination at step 206 (FIG. 4) indicating that the MS supports the transmission of its IP address results and further processing at step 250 in which a determination is made of the method supported by MS 10 to transmit its IP address. In one method, "calling party subaddressing", MS 10 as shown in step 252 includes its IP address as part of the calling party subaddress in the call set up request transmitted from MS 10 to MSC 24. In another method, "user-to-user signaling services", as shown in step 254 MS 10 sends its IP address as part of a user-to-user information element as part of the call set up request. The MSC-24 shall have the ability to convert the user-to-user information and generate a Short Message containing the contents (for example, if the ISUP signaling does not support User-to-User signaling).

Following step 252 or 254, call origination proceeds in the first communication system in step 256. In step 258, MS 10 waits for a message indicating call path completion. A step 260, a determination is made by MS 10 of whether the IP address of the called party has been received as part of the call completion message. A NO determination at step 262 results in the call being processed as a conventional call request. A YES determination at step 264 causes MS 10 to transmit the received IP address of the called party (device 18) to its device 12. Thus, from the perspective of the call origination side, the originating user's IP address has been conveyed to the called party, and the IP address of the called party has been received by the originating user. The exchange of the IP addresses has taken place within the first communication system even though broadband communications that will follow utilizing the exchange IP addresses will proceed on a second communication system.

Figure 6:
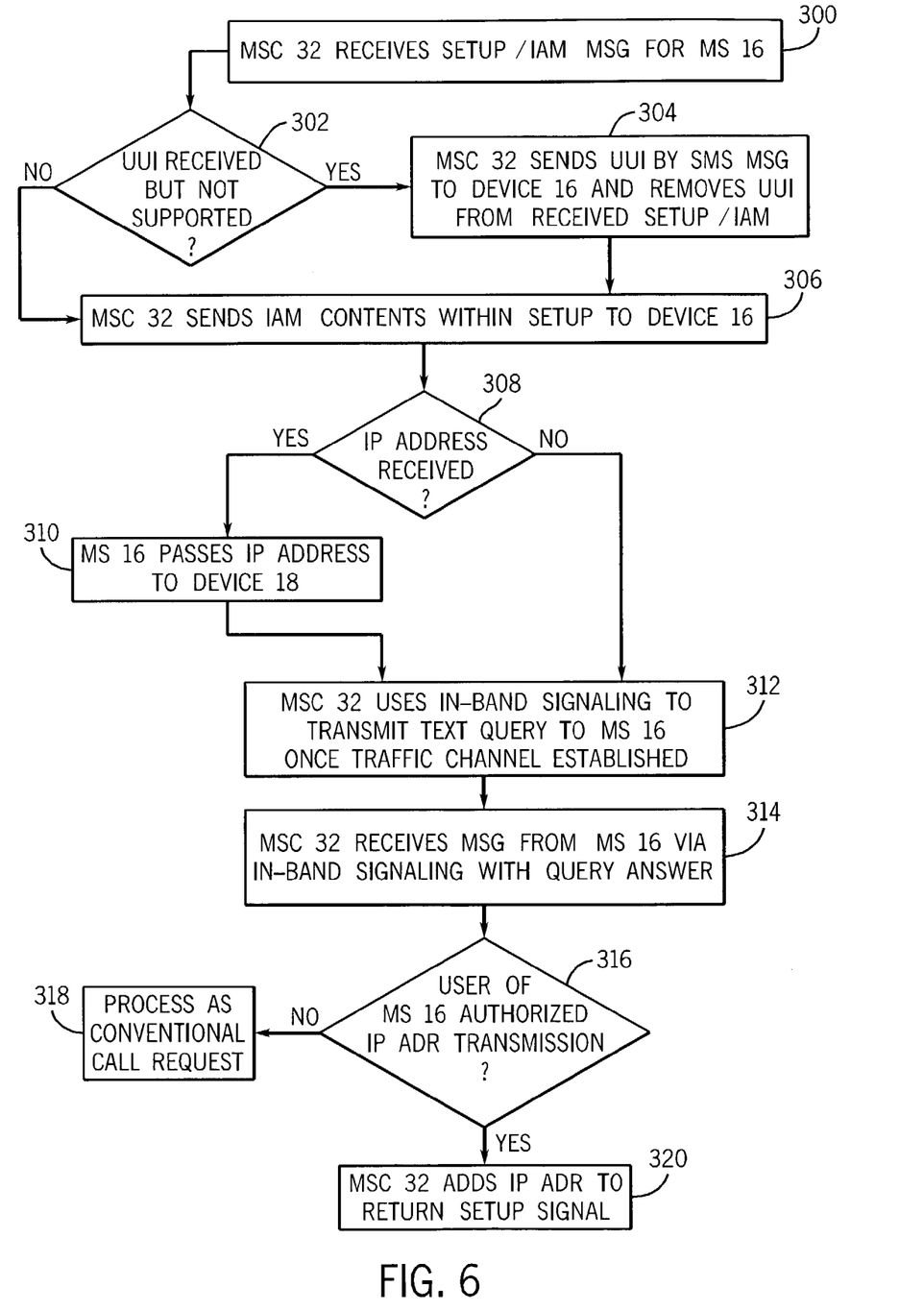
FIG. 6 illustrates an exemplary flow diagram of the same embodiment of FIGS. 4 and 5 from the call termination perspective.

In FIG. 6 processing is shown for the fourth embodiment from the perspective of the termination side. In step 300 MSC 32 receives a call origination set up message (IAM) for MS 16 from the originating party MS 10. In step 302 a determination at MSC 32 is made of whether a user-to-user information element is received, but is not supported by MSC 32. A YES determination at step 302 results and MSC 32 sending the content of the user-to-user information element by an SMS message to device 16 and removing the user-to-user information element from the received set up message/IAM. Step 306 follows either a NO determination at step 302 or step 304. The MSC 32 sends the contents of the IAM to MS 16. In step 308 a determination is made by MS 16 of whether the IP address of the originating party has been received as part of the call set up messaging. A YES determination results in MS 16 passing the received IP address to device 18 at step 310. A NO determination at step 308 or following step 310, MSC 32 uses in-band signaling to transmit the text query to MS 16 once a traffic channel is established. The in-band signaling may comprise a "whisper" or toned signaling after the MS 16 answered. MSC 32 could delay the sending of the ISUP ANM until after the authorization is received. In step 314 MSC 32 receives a message from MS 16 by in-band signaling in response to the query text; [alternatively, SMS messages could be used.] In step 316 a determination is made based on the received query answer of whether the user of MS 16 authorized the transmission of the IP address of device 18. A NO determination results in processing continuing as a conventional call request/answer at step 318. A YES determination at step 316 causes the MSC 32 to add the called party's IP address to the call-associated return call set up signal such as in ISUP Answer message/CONNECT message (with Connected Party subaddress or User-to-user information element) or in a subsequent message such as FACILITY or USER INFORMATION with User-to-user information element from mobile 16) [or alternatively the MS 16 could have provided this in CONNECT so the MSC 32 can simply pass this information as normal to ISUP Answer] to be transmitted to MS 10 after step 320. Thus, from the perspective of the termination side, the called party has received the IP address of the originating party and, assuming authorization by the called party, the IP address of the called party has been added to a return set up signal for receipt by the calling party. Alternatively, in step 320, the MSC 32 could generate a SMS message to include the IP address to the terminating mobile 16.

Although various modifications and substitutions can be made, the scope of the invention is defined by the claims that follow.

We claim:

1. A method in a first wireless communication system for obtaining communications-related identification information associated with a second communication system comprising the steps of:
   receiving a first request for initial communication services from a first wireless subscriber at a first switching center of the first communication system;
   determining if the first request contains a first flag identifying the request as seeking the communications-related identification information about a second subscriber in the second communication system;
   generating and transmitting a first message to the second subscriber in response to the first request containing the first flag, the first message containing a text query identifying the first message as seeking the communications-related identification information associated with the second subscriber;
   determining if the second subscriber authorizes the transmission of communications-related identification information associated with the second subscriber upon receipt of the first message;
   transmitting a reply message to the first subscriber including the communications-related identification information of the second subscriber by the first communication system if the second subscriber authorizes said transmission.

2. The method according to claim 1 wherein the step of generating and transmitting further comprises transmitting as part of the first message communications-related identification information associated with communicating with the first subscriber in the second communication system.

3. The method according to claim 1 wherein the step of determining if the first request contains the first flag is made by a first switch serving the first subscriber.

4. The method according to claim 3 wherein the step of transmitting the reply message is implemented by a second switch serving the second subscriber.

5. The method according to claim 1 wherein the step of generating and transmitting the first message comprises the step of generating and transmitting a first short messaging system (SMS) message directed to the second subscriber.

6. The method according to claim 5 wherein the step of transmitting the reply message to the first subscriber comprises the step of transmitting a second SMS message directed to the first subscriber.

7. The method according to claim 5 wherein the step of generating and transmitting the first SMS message directed to the second subscriber comprises originating the first SMS message at a first switch supporting communications with the first subscriber.

8. The method according to claim 7 further comprising the step of retrieving the communications-related identification information associated with the first subscriber from a database by the first switch and including said retrieved information in said first SMS message.

9. The method according to claim 1 further comprising the steps of receiving at a first wireless device of the first subscriber the communications-related identification information of the second subscriber, and automatically transferring said received information from the first wireless device to a second device of the first subscriber where the second device provides communications by the second communication system.

10. The method according to claim 9 wherein the step of transferring comprises utilizing a data communication link between the first and second devices via a cable.

11. The method according to claim 1 wherein the step of generating and transmitting the first message comprises generating and transmitting the first message as part of a call set up message that contains the text query.

12. The method according to claim 11 wherein the call set up message comprises communications-related identification information associated with communicating with the first subscriber in the second communication system.

13. The method according to claim 1 wherein the step of transmitting a reply message comprises transmitting the communications-related identification information of the second subscriber in a call-associated return call set up message.

* * * * *